United States Patent [19]

Kaun

[11] Patent Number: 4,764,437

[45] Date of Patent: Aug. 16, 1988

[54] LITHIUM DISULFIDE BATTERY

[75] Inventor: Thomas D. Kaun, New Lenox, Ill.

[73] Assignee: The United States of America as represented by the Department of Energy, Washington, D.C.

[21] Appl. No.: 868,388

[22] Filed: May 29, 1986

[51] Int. Cl.⁴ .................................... H01M 10/44
[52] U.S. Cl. .................................. 429/50; 429/199; 429/221
[58] Field of Search .................. 429/50, 199, 221

[56] References Cited

U.S. PATENT DOCUMENTS

| | | | |
|---|---|---|---|
| 3,488,221 | 1/1970 | Shimotake et al. | 429/199 X |
| 3,591,418 | 7/1971 | Sutula | 429/199 X |
| 3,615,828 | 10/1971 | Fischer | 429/199 X |
| 3,941,612 | 3/1976 | Steunenberg et al. | |
| 4,006,034 | 2/1977 | Shimotake et al. | |
| 4,056,662 | 11/1977 | Zellhoefer | 429/199 X |
| 4,145,806 | 3/1979 | Lai | 429/207 X |
| 4,239,837 | 12/1980 | Hartmann et al. | 429/104 |
| 4,332,866 | 6/1982 | Jacquelin et al. | 429/50 |
| 4,386,019 | 5/1983 | Kaun et al. | 429/103 X |
| 4,440,837 | 4/1984 | Shimotake et al. | 429/112 |
| 4,444,857 | 4/1984 | Duchange et al. | 429/191 |
| 4,446,212 | 5/1984 | Kaun | 429/103 |
| 4,540,642 | 9/1985 | Kaun | 429/131 |

OTHER PUBLICATIONS

Kaun, "Li-Al/FeS₂ Cell with LiCl-LiBr-KBr Electrolyte", *Journal of Electrochemical Soc.*, vol. 132, pp. 3063-3064, (12/1985).

Bergman et al., *Russian Journal of Inorganic Chemistry* vol. 8, No. 3, pp. 366-369, 1963.

Toguri et al., "Br-Cl Exchange Equilibria in Systems of HCl, HBr and M(Cl-Br), *Acta Chemica Scandinavica*, vol. 17, pp. 1502-1508, 1963.

Aukrust et al., *Annals of N.Y. Academy of Sciences*, vol. 79, pp. 830-837, 1960.

Primary Examiner—Brian E. Hearn
Assistant Examiner—Stephen J. Kalafut
Attorney, Agent, or Firm—Hugh W. Glenn; Robert J. Fisher; Judson R. Hightower

[57] ABSTRACT

A negative electrode limited secondary electrochemical cell having dense FeS₂ positive electrode operating exclusively on the upper plateau, a Li alloy negative electrode and a suitable lithium-containing electrolyte. The electrolyte preferably is 25 mole percent LiCl, 38 mole percent LiBr and 37 mole percent KBr. The cell may be operated isothermally.

6 Claims, 5 Drawing Sheets

LITHIUM DISULFIDE BATTERY

CONTRACTUAL ORIGIN OF THE INVENTION

The United States Government has rights in this invention pursuant to Contract No. W-31-109-ENG-38 between the U.S. Department of Energy and Argonne National Laboratory.

BACKGROUND OF THE INVENTION

This invention relates to a device for storing electrical energy which typically is denoted as a secondary electrochemical cell of the general type described in the Shimotaki et al, U.S. Pat. No. 3,488,221 issued Jan. 6, 1970 assigned to a predecessor in interest of the assignee of this application. Typical secondary cells have long shelf lives, and may be completely and repeatedly charged and discharged at either rapid or slow rates and can produce extremely high currents for short periods of time. Secondary cells are versatile and may be used as constant voltage sources over long periods of time or as sources for large currents for short period of time. Secondary cells of this general type have uses in space and other remote areas.

In prior developed high-temperature secondary electrochemical cells, the positive electrode generally has been formed with chalcogens such as sulfur, oxygen, selenium or tellurium, as well as their transition metal chalconides, and have included the sulfides of iron, cobalt, nichel and copper.

In high temperature cells, current flow between electrodes often is transmitted by molten electrolytic salt. Particularly useful salts include compositions of the alkali metal halides and/or the alkaline earth metal halides ordinarily incorporating a salt of the negative electrode-active metal, such as lithium, see column 2 of the Shimotaki et al, U.S. Pat. No. 3,488,221. One problem with many of the electrolytes available is the limited dynamic range, which is the ratio of alkali or alkaline metal earth ions for which the electrolyte will remain liquid, at a specific temperature, to avoid the electrolyte from solidifying in the electrodes as the concentration of positive ions changes during cell operation. The larger the dynamic range the more useful the electrolyte since electrolyte solidification reduces electrode efficiency.

Alkali metals such as lithium, sodium, potassium or alkaline earth metals including calcium, magnesium and others along with alloys of these materials have been used as negative electrode active materials. Alloys of these materials such as lithium-aluminum, lithium-silicon, lithium-aluminum-silicon, lithium-magnesium as well as many others have been used to improve retention of the electrode active material at the high operating temperatures of these secondary electrochemical cells.

A preferred cell along with a method of making an anode was disclosed in U.S. Pat. No. 4,386,019 issued May 31, 1983 to Kaun et al, assigned to the assignee of this invention, the entire disclosure of which is incorporated herein by reference. In the U.S. Pat. No. 4,386,019, a method of fabricating an anode was disclosed, but that method is applicable to fabricating both electrodes of the present invention. In my prior U.S. Pat. No. 4,446,212 issued May 1, 1984, assigned to the assignee of this invention, the entire disclosure of which is incorporated by reference, it was stated that a disadvantage of previous cells incorporating a lithium-aluminum electrode was the reduction in cell capacity during prolonged operation, and the patent disclosed a cell including a basic lithium-aluminum negative electrode with an iron sulfide (FeS or $Fe_2S$)positive electrode along with an electrolyte blended of lithium chloride and potassium chloride. In this positive electrode, the typical loading density was 1.5 $Ah/cm^3$, a fairly typical density. The invention there disclosed included the addition of an aluminum-iron alloy, and/or graphitized carbon and/or magnesium oxide to the negative electrode in order to reduce the declining capacity due to repeated discharge.

In the design and consideration of iron sulfide secondary cells, it has long been known that the higher voltage (1.75 avg. V) reaction of $FeS_2 + 2 Li^+ + 2e^- \rightarrow Li_2FeS_2$ is endothermic. It has also been well known that the lower voltage (1.33 avg. V) reaction of $Li_2FeS_2 + 2Li^2 + 2e^- \rightarrow 2Li_2S + Fe$ is exothermic, whereby the net positive electrode reaction is exothermic. The typical iron sulfide cell has operated using both the higher voltage reaction, hereafter the "upper plateau" and the lower voltage reaction, hereafter the "lower plateau", so that the conventional iron sulfide electrode was a two plateau (t.p.) electrode. It has long been desirable to provide an electrochemical cell which is endothermic at the positive electrode but until the present invention that has not been possible.

This invention provides a secondary cell which has substantially uniform discharge capacity over extended charge-discharge cycles and operates entirely on the upper plateau reaction, providing a endothermic positive electrode reaction. The vastly improved discharge capacity is due, it is believed, to a combination of a new electrolyte having a low melting point and improved dynamic range, a new higher loading density $FeS_2$ positive electrode and a cell design that is negative electrode limited which ensures that the positive electrode is limited to its upper plateau reaction. This invention includes a higher density positive electrode for a secondary electrochemical cell, a low melting point electrolyte having an expanded dynamic range, a molybdenum cladded housing and a method of isothermally operating a secondary electrochemical cell.

SUMMARY OF THE INVENTION

This invention relates to an improved $FeS_2$ positive electrode secondary electrochemical cell having a long and stable cycle-life wherein the $FeS_2$ electrode is limited to the upper electrochemical plateau, thereby providing an endothermic positive electrode reaction. The invention also relates to a method of isothermally operating a cell having the aforesaid positive electrode.

A principal object of the invention is to provide a cell which maintains substantially constant capacity utilization over prolonged charge/discharge cycles.

Another object of the invention is to provide a denser positive electrode capable of endothermic reaction and method of isothermally operating a cell having such an electrode.

Another object of the invention is to provide a new low melting point electrolyte with an expanded dynamic range.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

For the purpose of facilitating an understanding of the invention, there is illustrated the accompanying drawings.

DETAILED DESCRIPTION OF THE INVENTION

Figure 1:
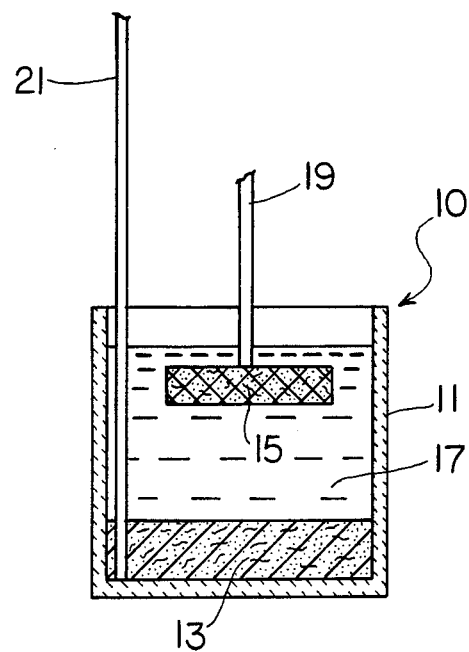
FIG. 1 is a schematic illustration of an electrochemical cell that can be used in testing the electrode of the present invention.

FIG. 1 illustrates an electrochemical cell 10 suitable for testing electrodes of the present type, the cell 10 being disclosed also in my U.S. Pat. No. 4,011,374 issued Mar. 8, 1977 and assigned to the assignee of this application, the disclosure of which patent is incorporated herein by reference. The cell 10 includes a nonconductive exterior housing 11, a negative electrode 13 and a positive electrode 15 separated by molten electrolyte 17. Electrode conductors 19 and 21 respectively extend from the positive electrode 15 and the negative electrode 13. Although schematic in nature, it will be understood that one skilled in the art can make an electrochemical cell 10 of the same general type to incorporate multiple layers of negative and positive electrodes separated by molten electrolyte, all with suitable support members, insulators and other items well known in the art.

Figure 2:
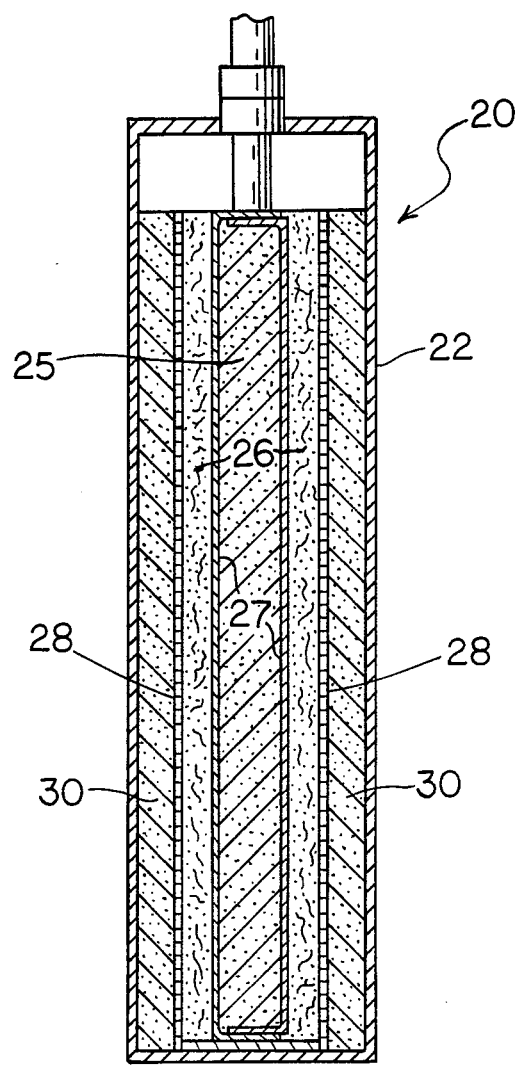
FIG. 2 is a schematic illustration of a special testing design for an electrochemical cell.

FIG. 2 illustrates a special test cell 20 of the type used to generate the data hereinafter reported. Because typical multiplate cells exhibit more electrode agglomeration for an inner negative electrode, that is an electrode operated with electrolyte at both faces, the test cell 20 incorporates such a design. The test cell 20 is positive grounded with a housing 22 being stainless steel having molybdenum cladding or coatings of Mo, TiN and/or TiC on the interior surface to double as an improved current collector and has a center negative electrode 25, which may be slurry-formed lithium-aluminum alloy (53 at. % lithium and 70 amp. hr. capacity) and which is surrounded by a boron nitride separator 26. By providing an internal cladding of molybdenum, or coating of TiN, or TiC on a cell housing of the type herein illustrated or of the type illustrated in FIG. 2 of U.S. Pat. No. 4,540,642, issued to me Sept. 10, 1985, the disclosure of which is herein incorporated by reference, the fabrication is made easier, at lower cost to provide a more durable construction and at a lower weight. The current collection for the $FeS_2$ electrode is also improved. Perforated current collectors 27 and 28 are respectively at the outer boundaries of the negative electrode 25 and at the inner boundaries of iron sulfide positive electrode 30. The perforated current collectors 27, 28 have apertures about 38 mils in diameter with 45% of each sheet being open area. The test cell 20 is designed with the positive electrode 30 having approximately twice the capacity compared to the negative electrode 25, whereby the test cell 20 capacity if controlled by the negative electrode 25.

The improved dense positive electrode which may be made in accordance with the methods set forth in the previously referenced U.S. Pat. No. 4,386,019 has a higher loading density of about 2.4 Ah/cm³. By dense electrode, it is meant that the electrode-active material is present in the range of from about 40 volume percent to about 60 volume percent. The preferred electrode contains 50 volume percent $FeS_2$. If less than 40 volume percent of the positive electrode active material is present, then the electrode is not dense within the definition herein used and if the positive electrode material is present in an amount greater than about 60% volume percent, there is insufficient electrolyte available to provide an adequate reaction. The positive electrode of the invention has for its principal electrode active material $FeS_2$. Although minor amounts of cobalt, nickel, copper, chalcogens or other traditionally used electrode-active materials may be incorporated in the positive electrode. Another advantage of operating at the upper plateau is the reaction product $Li_2 FeS_2$ is more dense than the reaction product $Li_2S$ of the lower plateau reaction so that positive electrode operation only at the upper plateau needs to accommodate less discharge volume, making the electrode smaller have higher energy density.

In order to ensure that the electrochemical cell having a dense $FeS_2$ operates entirely on the upper electrochemical plateau, the electrochemical cell must be negative electrode limited, as defined herein and in the aforementioned U.S. Pat. No. 4,446,212. This means that the amount of electrode-active material present in the electrodes is such that during discharge, the negative electrode active material is first depleted. By providing a negative electrode limited cell, it has been possible to provide an electrochemical cell having a dense $FeS_2$ electrode operating entirely on the upper plateau.

Since the electrochemical reaction $FeS_2 + 2 Li^+ + 2e^- \rightarrow Li_2 FeS_2$ is endothermic and the positive electrode operates only on the upper plateau, by choosing the rate of discharge, an isothermal operation can be obtained for the first time. In addition, even if isothermal conditions are not maintained during cell discharge, the endothermic nature of the positive electrode reaction substantially offsets the $I^2R$ heating generated during cell discharge, thereby substantially reducing the cooling requirements of the secondary electrochemical cell. This important aspect of the invention enables the battery system to be smaller, lighter weight and more reliable, especially for high power systems.

It has also been found that the eutectic of lithium chloride, lithium bromide, potassium bromide, wherein the lithium chloride is present in the amount of 25 mole percent, the lithium bromide is present in the amount of 38 mole percent and the potassium bromide is present in the amount of 37 mole percent having a melting point of 310° C. provides a significant improvement in cell operation. Electrochemical cells having the dense $FeS_2$ electrode herinbefore described have been operated with other electrolytes such as other mixtures of lithium chloride, lithium bromide and potassium bromide as well as the lithium chloride and potassium chloride electrolyte disclosed in my U.S. Pat. No. 4,446,212 and other electrolytes from the KBr-LiBr-KCl-LiCl phase diagram bounded by 10-100 mole percent $Br^-$, balance $Cl^-$ and 50-75% mole percent $Li^+$, balance $K^+$ would be acceptable; however, it has been found that using the aforementioned eutectic of lithium chloride, lithium bromide and potassium bromide in combination with the dense $FeS_2$ electrode provides lower operating temperatures, eliminates the capacity-loss problem of the Li-Al/$FeS_2$ system with the LiCl-KCl electrolyte. The new electrolyte allows operating temperatures in the range of from about 340° C. to about 430° C., preferably in the range of from about 388° C. to about 400° C.

In addition, the new electrolyte provides another totally unexpected bonus as it has a substantially greater dynamic range than previously used electrolytes. By expanded dynamic range it is meant that the electrolyte remains liquid for greater ratios of lithium to potassium concentrations than heretofore possible. As is known, the ratio lithium to potassium concentrations in the electrolyte composition varies since lithium is pulled out of the electrolyte at one electrode and introduced into the electrolyte at the other electrode. Because of the wider liquidus range of the inventive electrolyte, the cell may be charged and discharged at higher current densities without forming solids in the electrodes because of electrolyte freezing. The dynamic range of the new electrolyte is such that the liquidus extends over lithium ion to potassium ion ratios of 1.25 to 2.6, a significant improvement over the liquidus range for the lithium chloride-potassium chloride electrolyte reported in my U.S. Pat. No. 4,446,212 of 1.25 to 1.81. The broader liquidus range prevents salt crystallization in the electrodes at high current densities.

Prismatic bicells (24 and 48 Ah capacity) with separator area of 100 $cm^2$ (BN felt, from Kenecott) were fabricated for evaluating performance and cycle life of the Li-Al/LiCl-LiBr-KBr/$FeS_2$ (upper plateau) system. The initial test cell duplicated earlier test cells used for evaluation the Li-Al/LiCl-KCl/T.P.-$FeS_2$ system. The electrodes (8.7 cm high×6.3 cm wide) were contained behind perforated-sheet current collectors—molybdenum for the central $FeS_2$ electrode and 1008 steel for the two Li-Al electrodes.

The iron disulfide electrode contained $FeS_2$ with 15 mole percent $CoS_2$ additive for a total theoretical capacity of 24 or 48 Ah (on the upper plateau). The slurry-formed LiAl electrodes contained 53 at. % Li-Al alloy for 35 or 70 Ah capacity with 0.9 Ah/$Cm^3$ loading density. Cells were assembled with a BN powder feed-through seal. The electrolyte (from Anderson Physics Lab.) was added to the cells in the molten state. Cells were subsequently operated in an argon glovebox.

Cycle-life testing at a 8-h charge rate and 4-h discharge rate (50 or 100 mA/$cm^2$) was controlled between voltage cutoffs of 2.05 and 1.25 V (IR included), respectively. A Ni/$Ni_3S_2$ reference electrode indicated working-electrode potentials during the deep-discharge cycling. Current interrupts of one second duration were used to evaluate electrode and cell resistances. Power measurements were derived by integrating voltage at constant-current pulses (10–100 A) of 15-s duration.

Figure 3:
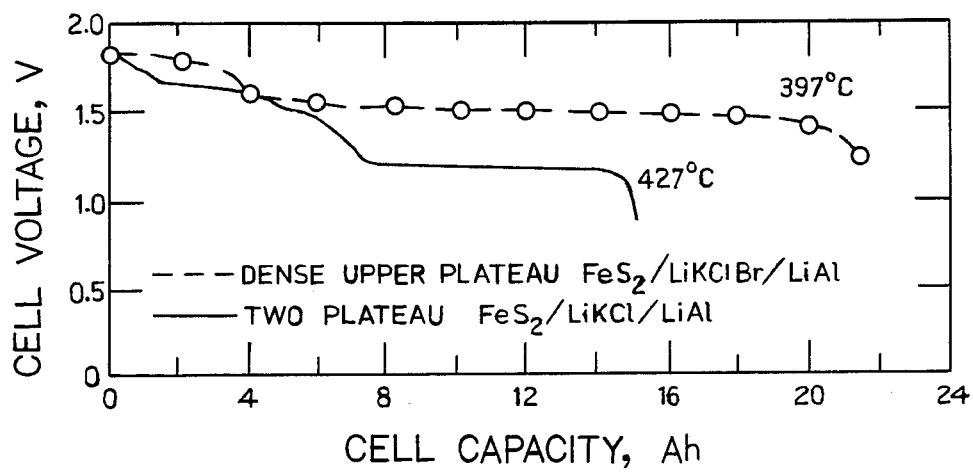
FIG. 3 is a graph illustrating the relationship between cell voltage and cell capacity for two different cells.

The Li-Al/LiCl-LiBr-KBr/$FeS_2$ (upper plateau) cell, which was cycle-life tested at 397° C. had at least 50% higher energy density than a Li-Al/LiCl-KCl/$FeS_2$ (two plateau) cell of the same size, which was operated at 427° C. The voltage/capacity curves of these two cell types (each of approximately 24 Ah theoretical capacity) are presented in FIG. 3. Energy density at 50 mA/$cm^2$ for the $FeS_2$ (upper plateau) cell was enhanced as a result of an approximately 50% higher utilization of the capacity and a 10% higher average discharge voltage. The energy density at higher discharge rates, 100 and 150 mA/$cm^2$, showed even greater improvement, with the utilization of capacity ranging from 82 to 75% at 397° C. The cell was capable of an 82% utilization at 150 mA/$cm^2$ was operated at 427° C. Cell capacity at 100 mA/$cm^2$ discharge current density was only slightly decreased as temperature was decreased from 427° C. to 388° C. The cell had good operability at temperatures as low as 380° C., but could be operated at temperatures as low as about 340° C.

Figure 4:
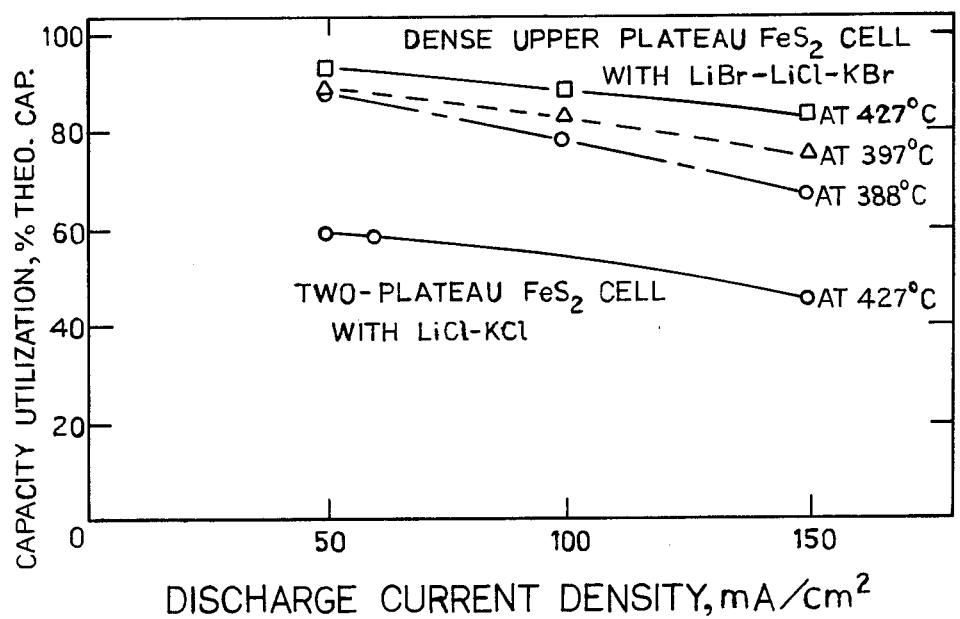
FIG. 4 is a graph showing the relationship between the capacity utilization and discharge current density for two different electrochemical cells.

The 48-Ah cell tested the performance at double thick (8 mm) $FeS_2$ (upper plateau) electrodes. The utilization vs. discharge current density of the 48 Ah cell matched that of the 24-Ah cell, see FIG. 4. The high energy density of cells was developed from high utilization of thick electrodes. At a discharge current density of 100 mA/$cm^2$, the thick-electrode $FeS_2$ (upper plateau) cell provided nearly a four-fold increase in energy storage with respect to separator area compared to that of the $FeS_2$ cell (two plateau) theoretical capacity was doubled and utilization was nearly doubled. Tests with six cels of 1 Ah capacity have confirmed these results.

The 48 Ah cell demonstrated an outstanding combination of high energy and power density. The power density of 80% depth of discharge (DOD) was enhanced by at least 100%, because of two factors. First, the cell voltage at 80% DOD was about 0.3 volts higher than that of a $FeS_2$ (two plateau) cell (see FIG. 3). Second, cell resistivity was also lower for the dense $FeS_2$ upper plateau) cell, ranging from 0.65 to $0.85 \Omega-cm^2$ for 5 to 80% DOD, respectively, compared with 1.2 to $1.6\Omega-cm$ for the $FeS_2$ (two plateau) cells. The higher voltage and lower resistivity of the $FeS_2$ (upper plateau) cell boost its power density to 0.8 Watts per square centimeter of separator area at 80% DOD from about a 0.3 value for the $FeS_2$ (two plateau) cell.

The improved power and energy densities of the iron disulfide electrode at the reduced operating temperatures of 388° to 427° C. are believed to be caused by two factors. One is improved electronic conductivity of the electrode. According to the Bruggeman equation $$Km = (1-f)^{3/2}$$

where Km=bed conductivity/dense body conductivity and f=electrolyte fraction. Thus, the increased electrode loading density (from 32 to 50 vol. %) would double the electronic conductivity of the iron disulfide electrode. The second factor is the increased dynamic range of the LiCl-LiBr-KBr eutectic electrolyte. At 400° C., this electrolyte has a liquidus that extends over a $Li^+/K^+$ ratio of 1.25 to 2.6; for LiCl-KCl, the range if only 1.25 to 1.81. The broader liquidus for the LiCl-LiBr-KBr electrolyte would tend to alleviates salt crystallation which is important, since it is believed that the crystallization of LiCl-KCl impedes high current density operation of molten-electrolyte cells.

Figure 5:
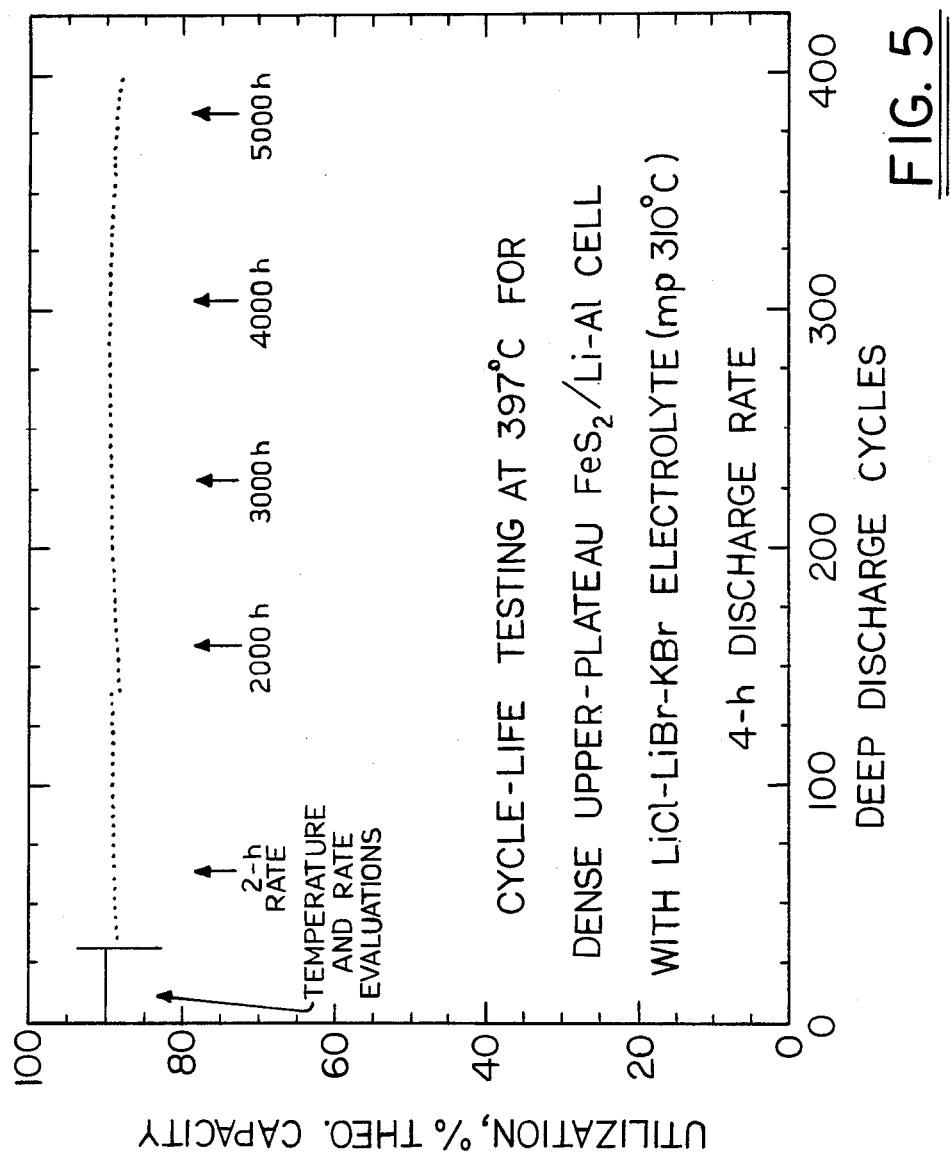
FIG. 5 is a graph showing the relationship between the cell utilization and deep discharge cycles for over 5,000 hours of operation.

The capacity utilization vs. cycle number for the $FeS_2$ (upper plateau) cell is shown in FIG. 5 (the coulombic efficiency of the cell is >99%). Its utilization is 89% at 50 mA/cm. The cell capacity has been nearly constant through more than 400 cycles and 5400 hours and the cell voltage vs. capacity curve was little changed (as in FIG. 3) during this time. In this test, the cell was charged at 25 mA/cm$^2$ to a charge cutoff voltage of 2.05 V. These values are greater than those that could be used with the Li-Al/LiCl-KCl/FeS$_2$ (two plateau) cell while maintaining stable capacity. Electrode potentials vs. the Ni/Ni$_3$S$_2$ reference electrode) indicate that both electrodes LiAl and FeS$_2$, mutually attain full charge.

Apparently, both time-related and cycle-related capacity loss has been eliminated in this cell. It has been found that thermal decomposition and solubility in LiCl-KCl of discharge reaction species are causes of capacity loss in the disulfide electrode. For the dense FeS$_2$ (upper plateau) electrode in LiCl-LiBr-KBr, the reduced operating temperature and increased cell performance (e.g. increased electrode-bed conductivity) promote capacity stability.

Figure 6:
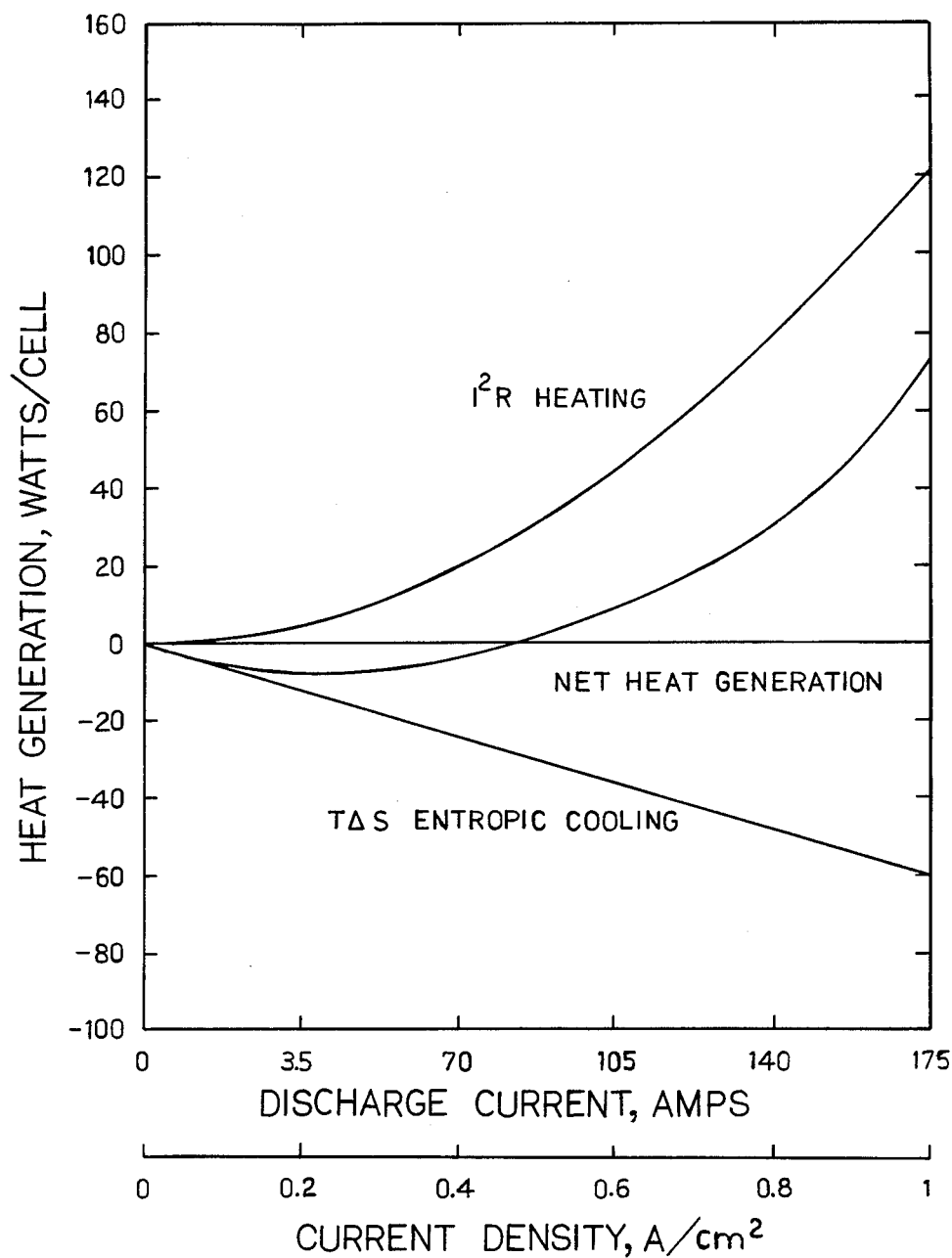
FIG. 6 is a graph showing the relationship between heat generation and the discharge current and current density.

The use of the dense FeS$_2$ (upper plateau) electrode and the lower-melting LiCl-LiBr-KBr electrolyte has eliminated the capacity-loss problem of the Li-Al/FeS$_2$ system; with LiCl-KCl electrolyte, the cell would have lost 30% of its capacity in the first 200 cycles. At the same time, the cell performance has been increase significantly. Based on the improved performance, a 250-Ah monopolar cell should achieve a specific energy of 175 Wh/kg at a 4-h rate and specific power of 200 W/kg at 80% DOD. Batteries from the new cells can be operated nearly isothermally because the unique entropic cooling of the upper-plateau FeS$_2$ discharge reaction can offset I$^2$R heating. FIG. 6 shows the relation required for isothermal operation of a high power cell, upper plateau FeS$_2$ cell having 175 cm$^2$ electrode area made in accordance with the method hereinbefore set forth operated at 397° C.

The embodiments of the invention in which an exclusive property or privilege is claimed are defined as follows:

1. A secondary electrochemical cell having an FeS$_2$ positive electrode having about 15 mole percent CoS$_2$, a Li alloy negative electrode and a suitable lithium-containing electrolyte, said cell being negative electrode limited and having only an endothermic discharge reaction of the positive electrode, wherein the cell operating temperatures are in the range of from about 340° to about 400° C., the electrolyte is about 25 mole percent LiCl and about 38 mole percent LiBr and about 37 mole percent KBr, the negative electrode has Li present in the range of from about 48 atom percent to about 53 atom percent.

2. The cell of claim 1 and further comprising a housing enclosing said positive electrode, negative electrode and electrolyte, said housing having the inner surface thereof molybdenum.

3. The cell of claim 2, wherein the housing is stainless steel having the inner surface thereof clad or coated with a material selected from the group consisting of molybdenum, TiN and TiC.

4. A secondary electrochemical cell with an FeS$_2$ positive electrode which is negative electrode limited having only an endothermic discharge reaction, wherein the negative electrode is a lithium alloy, wherein the lithium is present in the range of from about 48 atom percent to about 53 atom percent and the electrolyte is an eutectic of lithium chloride, lithium bromide and potassium bromide.

5. A secondary electrochemical cell having an FeS$_2$ positive electrode, which may contain an additive of about 15 mole percent CoS$_2$, an Li-alloy negative electrode and a LiCl-LiBr-KBr electrolyte, said cell being negative electrode limited, wherein the cell operating temperatures are in a range of from about 340° to 400° C., the electrolye is about 25 mole percent LiCl and about 38 mole percent LiBr and about 37 mole percent KBr.

6. An electrochemical cell with a FeS$_2$ positive electrode haivng only an endothermic discharge reaction, a Li-alloy negative electrode, wherein the amount of negative active material limits the cell, and an electrolyte of a eutectic of LiCl, LiBr, and KBr.

* * * * *